United States Patent
Meynerts et al.

(10) Patent No.: US 9,683,276 B2
(45) Date of Patent: *Jun. 20, 2017

(54) MILL SCALE BRIQUETTING

(75) Inventors: Udo Meynerts, Mulheim a.d. Ruhr (DE); Saulo Henrique Seabra Da Rocha, Herzogenrath (DE); Michael Maurer, Leichlingen (DE)

(73) Assignee: RHM Rohstoff-Handelsgesellschaft mbH, Mulheim a.d. Ruhr (DE)

( * ) Notice: Subject to any disclaimer, the term of this patent is extended or adjusted under 35 U.S.C. 154(b) by 1104 days.

This patent is subject to a terminal disclaimer.

(21) Appl. No.: 13/811,502

(22) PCT Filed: Jul. 2, 2011

(86) PCT No.: PCT/EP2011/003291
§ 371 (c)(1),
(2), (4) Date: Mar. 21, 2013

(87) PCT Pub. No.: WO2012/010254
PCT Pub. Date: Jan. 26, 2012

(65) Prior Publication Data
US 2013/0192421 A1    Aug. 1, 2013

(30) Foreign Application Priority Data
Jul. 21, 2010 (DE) .................. 10 2010 031 888

(51) Int. Cl.
| | | |
|---|---|---|
| C22B 1/16 | (2006.01) | |
| C22B 1/24 | (2006.01) | |
| C22B 1/244 | (2006.01) | |
| C22B 1/245 | (2006.01) | |
| C22B 1/248 | (2006.01) | |
| C22B 7/02 | (2006.01) | |

(52) U.S. Cl.
CPC .................. *C22B 1/16* (2013.01); *C22B 1/24* (2013.01); *C22B 1/244* (2013.01); *C22B 1/245* (2013.01); *C22B 1/248* (2013.01); *C22B 7/02* (2013.01); *Y02P 10/216* (2015.11)

(58) Field of Classification Search
CPC .... C22B 1/14; C22B 1/16; C22B 1/24; C22B 1/244; C22B 1/245; C22B 1/248; C22B 7/02; Y02P 10/216
USPC ...................................................... 23/313 R
See application file for complete search history.

(56) References Cited

U.S. PATENT DOCUMENTS 8,444,746 B2 * 5/2013 Meynerts ............ C21B 13/0046
23/313 R

* cited by examiner

*Primary Examiner* — Jessee Roe
*Assistant Examiner* — Jenny Wu
(74) *Attorney, Agent, or Firm* — Berliner & Associates

(57) ABSTRACT

The invention relates to a method of agglomerating iron oxide-containing residual substances, in particular scale and mill scale, wherein the residual materials and the paper sludge are dried and comminuted and agglomerates are produced by means of hot briquetting from the mixture comprising the residual substances and the paper sludge. In this way, mill scale briquettes of high strength and density can be produced which in steelmaking processes can then be charged into an electric arc furnace for the purpose of recycling the iron contained in the residual substances.

11 Claims, No Drawings

MILL SCALE BRIQUETTING

The invention relates to a method of agglomerating iron oxide-containing residual substances.

During the production of steel various residual materials are produced that often contain significant amounts of valuable substances, particularly iron in the form of iron oxide. Such iron oxide-containing residual matter may for example consist of filtering dust arising in steel mills and blast furnaces, sludge from gas purification systems and, in particular, scale or mill scale. These substances adhere to the metal surface in the form of waste material resulting from metal processing under the influence of oxygen at high temperatures. Mill scale, for example, arises in the form of oxide layers resulting during rolling and forging of steel as well as drawing of wire. Similar waste is produced in continuous casting processes. The scale layer negatively affects the rolling process so that it is usually eliminated by means of high-pressure water jet devices. The waste water containing the fine-grained mill scale collects in a scale pit arranged below the roll stand, with the resulting sludge settling in this pit not only contains metal oxide and water but also other impurities, especially in the form of grease and oil.

Scale or mill scale usually has an iron content as high as approx, 70% and consists of a mixture of several iron oxides in the form of FeO (60 to 66%), $Fe_3O_4$ (30 to 34%) and $Fe_2O_3$ (2 to 5%). In addition, it contains minor amounts of non-ferrous metal oxides and silicon dioxide.

In Germany, an average amount of 56.2 kg of residual matter per ton of crude steel arises during the production of steel. Steel production via the oxygen route results in 61.2 kg per ton of crude steel while 37.6 kg per ton of crude steel arise when electric arc furnaces are used (Institut für Baustoff-Forschung FEhS, 2005). The residual substances have the following composition:

| Route | Blast Furnace | Electric Arc Furnace |
| --- | --- | --- |
| Total residual matter | 61.2 $kg/t_{crude\ steel}$ | 37.6 $kg/t_{crude\ steel}$ |
| Filter dusts | 39.9 $kg/t_{crude\ steel}$ | 20.7 $kg/t_{crude\ steel}$ |
| Sludge | 6.1 $kg/t_{crude\ steel}$ | — |
| Scale | 10.9 $kg/t_{crude\ steel}$ | 10.5 $kg/t_{crude\ steel}$ |
| Mill scale sludge | 4.3 $kg/t_{crude\ steel}$ | 6.5 $kg/t_{crude\ steel}$ |

In the past, residual material arising during steel production was often disposed of on dump grounds, an approach to be considered problematic in view of ecological issues and the more and more stringent legal provisions aimed at alleviating impacts on the environment. However, against a background of the available dumping capacity (both above and below ground) being limited due to waste removal legislation and space restrictions in Germany such an approach can only be an interim and certainly not a long-term solution. Moreover, a large volume of the mill scale is utilized in the cement industry. Due to the high iron content, however, a recycling of iron oxide-containing residual substances such as scale and mill scale is also of interest for economic reasons.

Basically, residual/waste material can be recycled by means of sintering plants. In this context there is a problem with mill scale, however, because the remaining oil content in sintering plants must be less than 0.3% w/w, otherwise smoldering fire might be caused within the electrostatic precipitator. Mill scale has a high residual oil content and for that reason cannot be directly processed in a sintering plant. Though a preliminary oil removal can be achieved by means of rotary kiln, it would nevertheless be desirable to recharge the residual waste directly to the steel production process via the electric arc furnace.

Such a re-charge or feeding of mill scale to the steel production directly via electric arc furnaces cannot be effected, however, because the iron oxide particles would be discharged entrained in the waste gas and would increase the slag volume which would result in the energy consumption and environment being negatively affected. Due to this, a preliminary agglomeration of residual matter by way of briquetting or pelletizing as well as the addition of a carbon carrier or reduction/bonding agent is necessary. From the state of the art various processes are known for the briquetting of scale and mill scale, for example with the aid of cement (DE 23 60 595), hydrated lime and molasses (EP 0 630 980 A1) or silicates (WO 98/40523 A1). It was found, however, that the strength of briquettes manufactured in this manner was not sufficient. Sufficient strength, however, is of prime importance when introducing the agglomerates into an electric arc furnace to enable them to penetrate deeply into the process or melt, which means that even at high temperatures the agglomerates must withstand the thermal shock as well as the arising mechanical stress due to contact with non-molten scrap material fragments to make sure they enter the steel bath in undamaged state to the extent this is possible. The strength and consistency of the agglomerates must enable them to penetrate the slag layer existing on the surface of the steel melt. Otherwise, a premature decomposition of the agglomerate back into a dustlike state would cause the waste gas dust volume and/or slag volume to increase. Aside from this, agglomerates of high strength and firmness also offer further advantages since they are capable of withstanding other stresses, in particular those arising during handling and storage and when feeding them into the electric arc furnace. Moreover, it is to be ensured that neither the steel bath nor the slag layer is negatively affected by the bonding agents required for agglomeration. Another important aspect is to avoid to the extent possible the release of pollutants/contaminants during the process of agglomerate melting.

It is moreover considered advantageous if the density of the agglomerates is high (possibly >2.2 $g/cm^3$) to make sure they can penetrate the slag layer and then reach the surface of the steel bath. The agglomerate shall preferably release its metallic components as directly as possible to the melt on or within the melt surface layer.

From publication U.S. Pat. No. 2,865,731 a method is known according to which cellulose material is used in the briquetting of finely grained iron oxide arising during a hematite washing process. For this purpose, 12 to 18 American pounds of cellulose fibers are used per ton of iron oxide fine ore. It has turned out however that briquettes manufactured in this manner did not meet the requirements agglomerates must satisfy to be suitable for recycling purposes in steel production via electric arc furnaces.

Proceeding from the above described state of the art it is therefore the objective of the present invention to provide a method for the generation of agglomerates of iron oxide-containing residual substances by means of which agglomerates can be produced that have sufficient strength and firmness to make them suitable for recycling by feeding them to an electric arc furnace.

Surprisingly, it has been found that agglomerates of this nature comprising iron oxide-containing residual substances can be produced by a method by means of which paper sludge and, as the case may be, the residual substances are comminuted and a mixture of dry residual substances and dry paper sludge is briquetted at a temperature ranging between 70 and 350° C., with the water content of the dry residual materials and the dry paper sludge in each case being less than 5% w/w and wherein the mixture contains 15 to 35% w/w of dry paper sludge and wherein steel shavings, cast-material swarf, metal-containing steel mill residual material and/or metal-containing composite packing material are added to the mixture.

The examination of various bonding agents revealed that some customary bonding agents did not comply with the requirements that had to be satisfied in this respect. It was found however that paper sludge, i.e. fibrous substances on cellulose basis, was particularly suited for the intended purpose. Prior to briquetting a mandatory need in this respect was, however, to bring down the water content of the paper sludge since tests had shown too high a water content would seriously impede the compaction process. In the framework of this description, reference to dryness of the paper sludge and residual substances denotes that dry paper sludge and dry residual matter must have a water content of less than 5% w/w because eliminating the water entirely is neither necessary nor feasible as a rule.

Typically, the water content of paper sludge after delivery is approx. 57% w/w. More often than not, the water content of the iron oxide-containing residual substances is not acceptable, especially in the case of scale or mill scale where on average a water content of approx. 5% w/w is encountered. The paper sludge and, if necessary, the residual substances can be dried, for example, at a temperature of 85° C. for a period of 24 hours. After the drying process, the paper sludge has a flaky consistency and is to be further comminuted. It is frequently considered expedient to subject the residual substances to comminution as well.

Besides the iron oxide-containing residual substances, further metal-containing components are added to the mixture, for instance steel shavings, cast-material swarf and/or metal-containing residual material from smelting plants. Such metal-containing smelting plant residual material may be, for example, hot briquetted iron fines (HBI) or direct-reduced iron fines (DRI). HBI fines are remnants from larger sized ore lumps that are to be subjected to hot briquetting. Metal-containing composite packing material may as well be added to the mixture, in particular composite packing material of metal and cardboard/paper. Such material may be, for example, beverages packages reduced to small pieces known by the brand name of Tetra Pak® or Tetra Brik® that consist of carton material provided with an aluminum lining. It goes without saying that prior to briquetting such additive material must be reduced in size and mixed with other components. In the event paper-containing composite packaging materials are used, the respective paper content may be set off, if applicable, against the total paper sludge content of the mixture, i.e. the quantity of paper sludge to be employed reduces accordingly. Additional metal-containing components can be added up to a proportion of 90% w/w in relation to the iron oxide-containing residual substances.

In connection with the present invention it has surprisingly been found that the stability of the agglomerates could be significantly improved by hot briquetting.

With respect to strength, the briquettes were subjected to the so-called Brazilian test designed for the examination of cylindrical specimens. This test enables briquettes of various size and slimness (height-to-diameter ratio) to be compared and relevant splitting tensile strength characteristics determined. For briquettes produced by hot briquetting a tensile strength $\sigma_{bz}$ of 3.2 MPa was measured. Moreover, briquettes manufactured in this way had a sufficiently high density of more than 2.5 g/cm$^3$.

For comparison purposes similar tests were conducted with other bonding agents. It was also determined that briquettes to which 10% of cement had been added merely showed a maximum splitting tensile strength of between 0.1 and 0.4 MPa after a curing period of 28 days which cannot be considered adequate. Another important aspect is that the briquettes should have self-reducing properties, i.e. contain sufficient reduction agents to enable a maximum proportion of iron oxide to be transferred in metallic state to the steel bath in the recycling process. In the event cement is used as bonding material, an additional reduction agent has to be provided, however, to ensure the mixture as a whole has a self-reducing effect, said agent may be, for example, charcoal or coke breeze. This, however, results in the splitting tensile strength properties to deteriorate further.

The reason for the poor results achieved when using cement may be that this binder as well as the inherently existing water content lead to a further oxidation of the iron, for example through the oxidation from FeO towards $Fe_2O_3$ or through the formation of hydrates such as goethite. The new oxidation state as well as the hydrates weaken the bond between the cement and the particle surfaces of the residual substances, which ultimately causes a reduction of the strength characteristics.

Even if hydrated lime was employed as bonding agent the results achieved were inadequate. Strength characteristics of only 0.3 to 0.5 MPa were determined after a curing time of 28 days. The density of the briquettes amounted to approx. 1.1 g/cm$^3$, which was also insufficient. Adding molasses to the hydrated lime could not increase the strength of the briquettes significantly.

Briquettes of adequate strength and firmness could neither be produced by the addition of Volclay. When adding an amount of 5% w/w of Volclay a strength of 0.60 MPa was found and a value of 0.90 MPa was determined when adding 10% w/w of Volclay. These strength characteristics could not be notably improved by long-term curing. It is expected that this is due to a further oxidation of the iron oxide similar to what has been found when cement was used.

In accordance with the invention and as has already been mentioned hereinbefore, the iron oxide-containing residual substances in particular are scale or mill scale arising during the continuous casting and rolling of steel or other processes. In the context of the present invention, it is to be clearly understood, however, that any type of scale/mill scale is meant whenever reference is made to the term mill scale in the following text. Since mill scale is usually removed from the metal surface by means of a high-pressure water jet (250 to 280 bar) its water content as a rule is as high as approx. 5% w/w. Drying the material resulted in the briquetting properties to be significantly improved.

When using paper sludge that has not been preprocessed and typically has a water content of approx. 57% w/w the drying process is also of major importance. After drying, the paper sludge has a flaky consistency with a grain size of <20 mm. The dry paper sludge as well as the dry iron oxide-containing residual substances must have a water content of less than 5% w/w. In case preprocessed paper sludge is employed from which most of the water has already been removed, additional drying may be dispensed with, however.

From the dried and size-reduced paper sludge and the iron oxide-containing residual substances that as a rule have been dried and reduced in size as well a mixture is prepared containing 15 to 35% w/w of dried paper sludge. Good results in terms of strength/stability can be achieved if the paper sludge proportion is greater than 20% w/w and as the case may be greater than 26% w/w.

When paper sludge was used that had been dried but not reduced in size a segregation was noted that occurred when the sludge was mixed with the iron oxide-containing residual substances. These segregation problems can be minimized when the paper sludge flakes are size reduced/comminuted. Size reduction should be carried out in such a manner that the grain size of 90% w/w of the dried and comminuted paper sludge is below 1 mm.

The iron oxide-containing residual substances should also be reduced in size, especially the mill scale material. Mill scale in its original form has a relatively wide grain size distribution, i.e. 50% w/w of the particles are greater than 0.7 mm. The large particles are very brittle and must be regarded as the weakest constituents in the agglomerates because cracks and fractures originate from these locations. It was found that under otherwise identical briquetting conditions the strength and stability of briquettes consisting of finer mill scale was twice as high as of briquettes made of mill scale not subjected to a pretreatment. The residual substances should be reduced in size to an extent that the grain size of 90% w/w of the residual material in the mixture is less than 1 mm. Ideally, less than 5% w/w of the residual substances should have a grain size of more than 1 mm. However, there may be circumstances where a maximum particle size reduction of 2 mm may be considered sufficient both with respect to the comminution of the residual substances and the paper sludge.

Using a ball mill or a vibratory mill for the size reduction/comminution of the residual substances and paper sludge has proved to offer special advantages, with the operation of size reduction and mixing of these and possibly further components being preferably carried out simultaneously. It has been found that the residual substances are vigorously pressed into the fibers in this manner so that a segregation of the components can be effectively prevented. Otherwise, it could be expected that due to the significantly different density characteristics of residual substances on the one hand and paper fibers on the other segregation prior to briquetting would occur but must in any case be prevented in the interest of achieving adequate briquette strength and stability.

A ball mill is designed to comprise a horizontally supported rotating drum within which the material to be ground as well as wear-resistant grinding elements move together. Material located between the grinding elements is crushed due to the impact stresses exerted. Balls, cylindrical bodies, or pebbles may be used as grinding elements and it has been found that the best results can be achieved when cylindrical bodies are used. The same applies if vibratory mills are employed wherein the grinding elements inside the mill case exert relevant forces on the material to be ground due to the mill case performing an oscillating or vibratory motion.

As per an especially preferred embodiment of the invention and in addition to the residual substances and paper sludge being mixed and comminuted, the mixture inside the ball or vibratory mill is also dried and, if applicable or expedient, pre-heated prior to hot briquetting. In this way, only two devices are required for the inventive method, that is to say the ball or vibratory mill for the purpose of drying, mixing, comminuting, and preheating as well as the briquetting press to perform the briquetting process itself.

Crushing/comminution of residual substances and paper sludge may also be carried out, however, by means of a hammer mill, cutting mill or in a manner known to those skilled in the art. Comminution and mixing are preferably performed in a single work cycle; nevertheless, the residual material and the paper sludge can as well be comminuted separately before the respective mixing process takes place.

Surprisingly, it has been established that for the process of producing agglomerates the inventive method is also suitable for the processing of residual substances that contain oil as well as iron oxide, in particular mill scale, without the strength characteristics being negatively affected in an intolerable manner. The oil content in this case may range between 5 and 10% w/w maximum in relation to the residual substances. As already mentioned hereinbefore the oil content of mill scale intended as feedstock for sintering plants may cause major problems. Even when briquettes are produced with other binders as cement the oil content has detrimental effects with respect to the stability of the agglomerates.

The briquetting process, i.e. the production of agglomerates, with the term agglomerates encompassing within the scope of the invention not only briquettes but also pellets for example, is carried out in the form of hot briquetting at temperatures advantageously ranging between 90 and 250° C., in particular between 90 and 150° C. No bonding problems occurred when briquetting was carried out with beneficial results at a temperature of approx. 140° C. Therefore, the most preferred temperature ranges between 130 and 150° C. The diameter of the agglomerates ranges for example between 20 and 50 mm.

During briquetting, pressure is exerted between 10 and 500 MPa, preferably between 30 and 350 MPa and especially preferred between 100 and 200 MPa. Tests have shown satisfactory results when a pressure of approx. 150 MPa was applied.

During hot briquetting heating of the mixture can be effected in various ways, for example by means of a stream of inert gas, steam, hot air or a mixture of air and inert gas. Another possible way of mixture heat-up is by thermal transfer, either by direct contact or by radiation.

One or several bonding agents can be added to the mixture to be briquetted; for example liquid binders that are stable at elevated temperatures such as sodium silicate (water glass) or aluminum phosphate. Liquid bonding agents capable of preventing segregation may also be used as additives, examples in this case are molasses or spent sulfite liquor. Another option is to add an inorganic bonding agent, e.g. hydrated lime or caustic lime, to enhance desulfurization. Minor amounts of bonding agents on mineral basis may also serve to improve the high temperature strength of the mixture. Such agents should be added in an amount of between 1 and 10% w/w in relation to the total mass of the mixture.

Further components conducive to the manufacture of alloyed material may be added to the briquetting mixture used for the production of the agglomerates. Constituents of this nature may be added in the interest of achieving the desired composition of the steel to be produced with the aid of the agglomerated iron oxide-containing residual substances. The following additive materials can be added up to a proportion of 90% w/w in relation to the iron oxide-containing residual substances.

Aluminum
Copper
Manganese
Magnesium
Silicon
Silicon carbide (SiC)

Ferrochromium (FeCr)
Ferromanganese (FeMn)
Ferrophosphorus (FeP)
Ferrosilicon (FeSi)
Ferrosilicon magnesium (FeSiMg)
Ferrotitanium (FeTi)
Chrome
Nickel
Ferronickel
Molybdenum
Ferromolybdenum
Cobalt
Ferrocobalt
Zinc oxide
Zirconium
Tungsten
Vanadium
High-speed steel (HSS) powder Aside from the above mentioned advantages with respect to the strength and density of the agglomerates produced with the aid of paper sludge, there is another beneficial aspect associated with the use of paper sludge which is the low price of this material because paper sludge is a waste product arising in great quantity during the recycling of waste paper. Paper sludge moreover ensures that the agglomerates produced possess to a certain extent self-reducing characteristics so that a large proportion of the iron oxide is transferred in metallic state to the steel bath in the recycling process.

Aside from the inventive method described hereinbefore, the invention also relates to an agglomerate, in particular a briquette or pellet, that is obtained or produced by means of the inventive method.

Additionally, the invention also relates to the use of the agglomerates in the framework of steelmaking wherein the agglomerates are charged into an electric furnace, in particular an electric arc furnace. Aside from this, utilization may also take place in an induction furnace, a BOF/LD converter, a blast furnace, a shaft kiln, a cupola furnace, or a treatment vessel, e.g. a ladle. In this manner, the valuable substances in the residual material, and in particular the iron they contain in the form of iron oxide, are again put to use in the steelmaking process.

Embodiment Example

Mill scale (water content: 5% w/w) and paper sludge (water content: 57% w/w) were dried for a period of 24 hours in a drying cabinet at a temperature of 85° C. In this manner, the water content was lowered to less than 5% w/w in each case. After drying, the paper sludge had a flaky consistency with its grain size being less than 20 mm.

Following this, the mill scale, flaky paper sludge and a small amount of steel shavings were mixed at a ratio of 79:20:1% w/w and comminuted by means of a ball mill such that mill scale and paper sludge particles were produced the grain size of which was below 1 mm for 90% w/w of each of the constituents.

For hot briquetting purposes, the mixture was then charged into a cylindrical die. Briquetting was carried out at a pressure of 150 MPa and a temperature of 140° C. The strength (splitting tensile strength) of the briquettes produced in this manner was verified by means of the Brazilian test. The briquettes so produced had a strength of 3.2 MPa and a density of >2.5 g/cm$^3$.

High-Temperature Strength

To investigate the strength characteristics the above mentioned briquettes were tested under high-temperature conditions. When subjected to a pressure load of 1 MPa the briquettes maintained their original shape up to a temperature of approx. 1000° C. At higher temperatures the briquette suffered deformation but kept its integrity as an agglomerate which means there was no dust formation and the valuable iron constituents were capable of entering the deeper zone of the metallurgical reactor.

Melting Behavior

The produced briquettes (800 g) and steel blocks C45 (4000 g) were heated and melted in an induction furnace. The briquettes endured the heating process. The iron oxide was reduced to form metallic iron and dissolved in the metal bath. The melt was then poured into and cooled down in a casting die. The composition of the cast metal block did not show increased proportions of undesirable elements (e.g. sulfur, copper, tin).

The invention claimed is:

1. Method for the agglomeration of iron oxide-containing residual substances by means of which paper sludge is comminuted and, optionally, the residual substances are comminuted, and a mixture of residual substances, either having a residual substance water content of less than 5% by weight or dried to a water content less than 5% by weight, and dry paper sludge dried to a water content of less than 5% by weight, is briquetted at a temperature ranging between 70 and 350° C., wherein the mixture contains 15 to 35% by weight of dry paper sludge and wherein material selected from the group consisting of steel shavings, cast-material swarf, metal-containing steel mill residual material and metal-containing composite packing material are added to the mixture.

2. Method according to claim 1, characterized in that the iron oxide-containing residual substances are, at least in part, scale or mill scale.

3. Method according to claim 1, characterized in that the mixture contains 50 to 95% by weight of residual substances.

4. Method according to claim 1, characterized in that the size reduction is carried out simultaneously with mixing of the residual substances and the paper sludge in a ball mill or vibratory mill.

5. Method according to claim 4, characterized in that cylindrical bodies are used as grinding elements for the size reduction of the residual substances and the paper sludge.

6. Method according to claim 4, characterized in that a drying and/or preheating of the mixture is additionally carried out in the ball mill or vibratory mill.

7. Method according to claim 1, characterized in that briquetting is performed at a temperature ranging between 90 and 250° C.

8. Method according to claim 1, characterized in that briquetting is performed at a pressure ranging between 10 and 500 MPa, preferably between 30 and 350 MPa and particularly preferred between 100 and 200 MPa.

9. Method according to claim 1, characterized in that material selected from the group consisting of aluminum, copper, manganese, magnesium, silicon, silicon carbide, ferrochrome, ferromanganese, ferrophosphorus, ferrosilicon, ferrosilicon magnesium, ferrotitanium, chrome, nickel, ferronickel, molybdenum, ferromolybdenum, cobalt, ferrocobalt, zinc oxide, zirconium, tungsten, vanadium and steel powder are added to the mixture.

10. Method according to claim 1 or 2, characterized in that the mixture contains 65 to 85% by weight of residual substances.

11. Method according to claim 1, characterized in that briquetting is performed at a temperature ranging between 90 and 150° C.

* * * * *